United States Patent
Luh et al.

(10) Patent No.: US 8,817,493 B2
(45) Date of Patent: Aug. 26, 2014

(54) CONTROLLING AN ADAPTER TRANSFORMER VOLTAGE

(75) Inventors: Louis Luh, Sunnyvale, CA (US); Eric G. Smith, Palo Alto, CA (US); P. Jeffrey Ungar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 13/568,414

(22) Filed: Aug. 7, 2012

(65) Prior Publication Data

US 2014/0043860 A1    Feb. 13, 2014

(51) Int. Cl.
*H02M 3/335*    (2006.01)
*H02M 7/5387*    (2007.01)

(52) U.S. Cl.
USPC ............................................. 363/17; 363/98

(58) Field of Classification Search
CPC ..... H02M 1/42; H02M 1/4233; H02M 3/335; H02M 7/5387; H02M 2007/5387
USPC .......... 363/15, 16, 17, 98, 126, 132; 323/205, 323/207, 266
See application file for complete search history.

(56) References Cited

U.S. PATENT DOCUMENTS 4,688,165 A *   8/1987   Pruitt ............................. 363/132
2008/0219030 A1 *   9/2008   Chang ............................. 363/17

* cited by examiner

*Primary Examiner* — Gary L Laxton
(74) *Attorney, Agent, or Firm* — Park, Vaughan, Fleming & Dowler LLP; A. Richard Park (57) ABSTRACT

Embodiments of an adapter are disclosed that include a transformer with a primary coil coupled to an H-bridge. The H-bridge is controlled by a control circuit that controls a voltage across the primary coil using the H-bridge, and the control circuit is configured to control the H-bridge so that during each of one or more intervals, a first voltage pulse is applied across the primary coil in a start direction, wherein the start direction alternates between a first direction and a second direction each interval. Then, a direction of subsequent voltage pulses across the primary coil is alternated between the first direction and the second direction a predetermined number of times. After the predetermined number of times, a last voltage pulse is applied across the primary coil; then, voltage across the primary coil is reduced to zero for a predetermined time.

17 Claims, 7 Drawing Sheets

CONTROLLING AN ADAPTER TRANSFORMER VOLTAGE

BACKGROUND

1. Field

The present embodiments relate to power adapters. More specifically, the present embodiments relate to controlling a power adapter transformer voltage.

2. Related Art

Adapters that are designed to supply power to electronic devices such as laptop computers often include a power factor correction (PFC) circuit. Typically, the PFC circuit steps-up the input voltage to a higher voltage, and in order to safely handle this voltage, the PFC circuit must include one or more high voltage components. These components are often physically large and may take up a sizable portion of the adapter volume, which may interfere with other design considerations for the adapter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
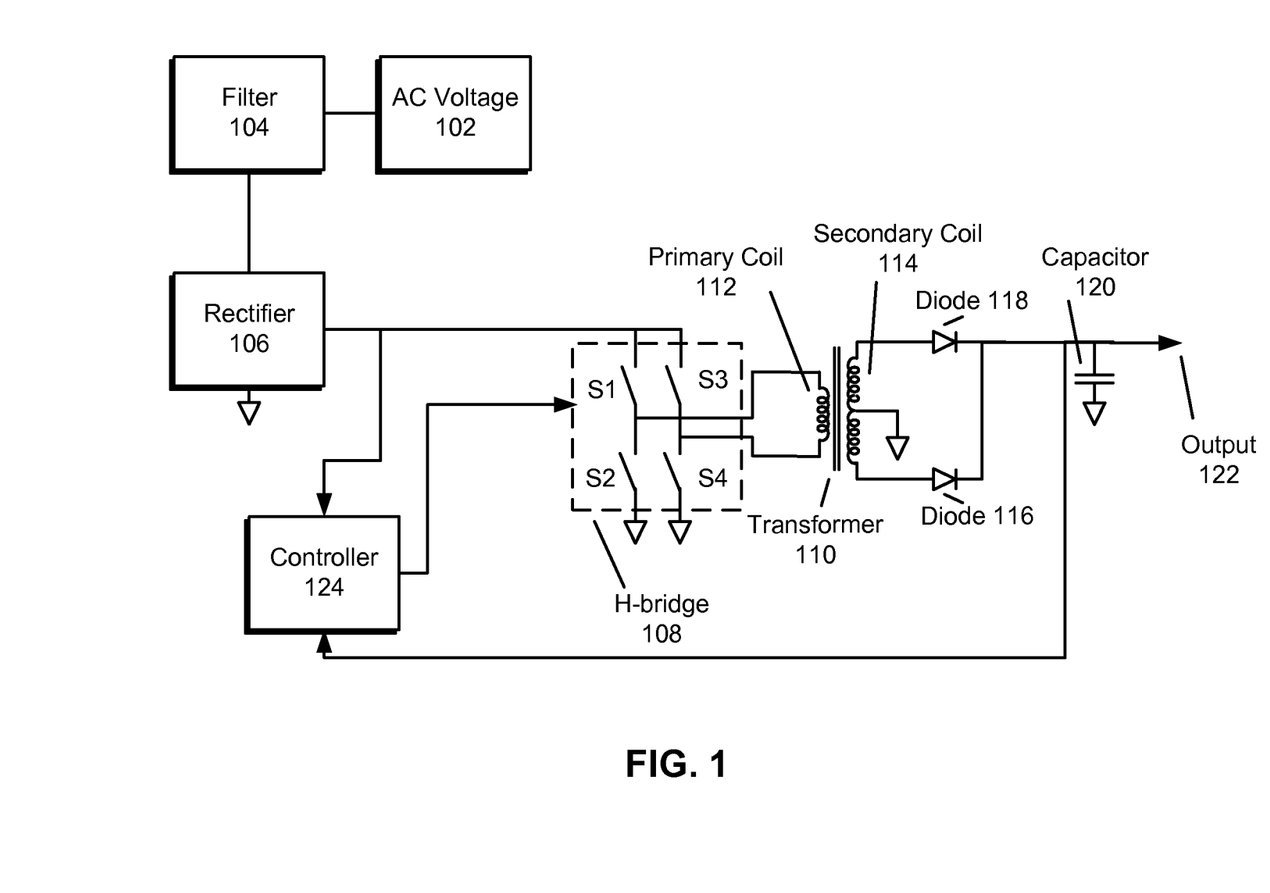
FIG. 1 shows an adapter in accordance with an embodiment.

FIG. 1 shows an adapter in accordance with an embodiment. Alternating current (AC) voltage 102 is coupled through filter 104 to rectifier 106 and into H-bridge 108. Transformer 110 includes primary coil 112 and center tapped secondary coil 114. Primary coil 112 is coupled to the output of H-bridge 108, and secondary coil 114 is coupled through diode 116 and diode 118 across capacitor 120 to output 122. Controller 124 receives input from rectifier 106 and output 122 and is coupled to and controls switches S1 through S4 in H-bridge 108.

AC voltage 102 is any device that outputs an AC voltage and may include but is not limited to a wall plug that can be plugged into an AC voltage outlet. For example, AC voltage 102 may be a standard wall plug that is plugged into an electrical outlet, and may be in any standard available in any country. Filter 104 is any line filter that filters the voltage from AC voltage 102. In some embodiments, filter 104 is omitted. Rectifier 106 is a voltage rectifier that converts the positive and negative voltage output from AC voltage 102 through filter 104 into voltage that is positive only. Rectifier 106 may include but is not limited to a full-bridge rectifier, or any other rectifier that outputs only a positive going voltage from an input that is positive and negative, and it may be implemented in any technology. In some embodiments, a capacitor is placed between the output of rectifier 106 and ground.

H-bridge 108 is any H-bridge that includes four individual switches S1-S4, each of which is controlled by controller 124. H-bridge 108 uses switches S1 to S4 to control the voltage across primary coil 112 in transformer 110. For example, when switches S1 and S4 are closed and switches S2 and S3 are open, the voltage from the top to the bottom of primary coil 112 is positive; when switches S1 and S4 are open and switches S2 and S3 are closed, the voltage from the top to the bottom of primary coil 112 is negative; and when all switches S1 to S4 are open, there is no voltage across primary coil 112. Note that switches S1 to S4 can each be any type of switch implemented in any technology that can switch in response to a control signal. For example, switches S1 to S4 may include but are not limited to being relays, or transistors such as FETs, including MOSFET transistors, and may be implemented using any combination of discrete and integrated components, and analog and/or digital technology.

Transformer 110 can be any transformer with a primary coil and a center taped secondary coil implemented in any technology. The winding ratio of primary coil 112 to secondary coil 114 can be set to any value based on the input voltage and the desired output voltage. For example, for an expected input voltage of 90 to 120 volts from AC voltage 102, and a desired output voltage in the range of 20 volts to 30 volts, a winding ratio between primary coil 112 and each arm of secondary coil 114 may be chosen to be 4 to 1.

Note that in some embodiments, an inductor is included between the center tap of secondary coil 114 and ground. This inductor may be selected based on factors including but not limited to a reduction of the peak current in diode 116 and/or diode 118.

Additionally, in some embodiments, an inductor is included between the output of H-bridge 108 and primary coil 112. This inductor may be selected based on factors including but not limited to the desired switching characteristics of one or more switches in H-bridge 108, such as soft switching for zero-voltage switching (ZVS).

Diode 116 and diode 118 can be any suitable diodes implemented in any technology and may be implemented using any combination of discrete or integrated technology. Capacitor 120 is any suitable capacitor implemented in any technology.

Controller 124 is a controller implemented in any combination of hardware and/or software and in any technology, and may include any combination of integrated and discrete components and may be implemented in any hardware module or apparatus. Controller 124 controls each switch S1 to S4 in H-bridge 108 using input received from rectifier 106 and output 122. Note that the input to controller 124 from output 122 may include an isolation device or circuit (not shown) to electrically isolate the secondary side of transformer 110 from the primary side, and may also include a voltage divider (not shown) to reduce the feedback voltage from output 122 to controller 124. For example, a resistive voltage divider and an opto-isolator may be inserted in the feedback path from output 122 to controller 124.

Output 122 may be coupled to or configured to be coupled to any electronic device that uses direct current (DC) voltage to operate, including but not limited to a laptop computer, a tablet computer, a smartphone, and/or a battery charger.

The adapter in FIG. 1 operates as follows. AC voltage is output from AC voltage 102 through filter 104 and into rectifier 106. Rectifier 106 rectifies the AC voltage so that it contains only positive going voltage. This voltage is then input into H-bridge 108 and controller 124 controls switches S1 to S4 to control the voltage across primary coil 112.

Figure 2A:
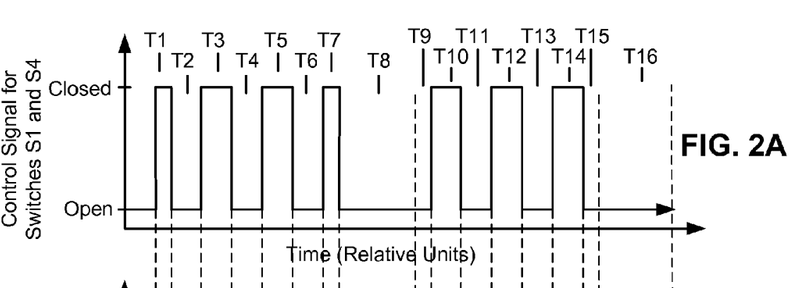
FIG. 2A depicts an exemplary graph of a control signal controlling two switches in an H-bridge coupled to the primary coil of a transformer in accordance with an embodiment.
Figure 2B:
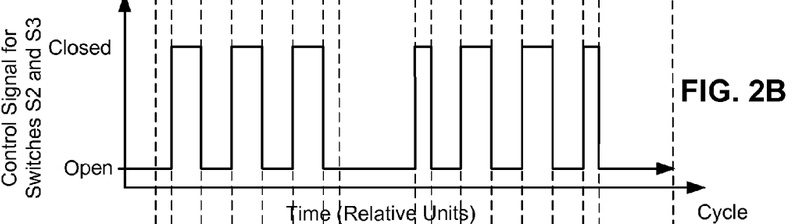
FIG. 2B depicts an exemplary graph of a control signal controlling two other switches in an H-bridge coupled to the primary coil of a transformer in accordance with an embodiment.
Figure 2C:
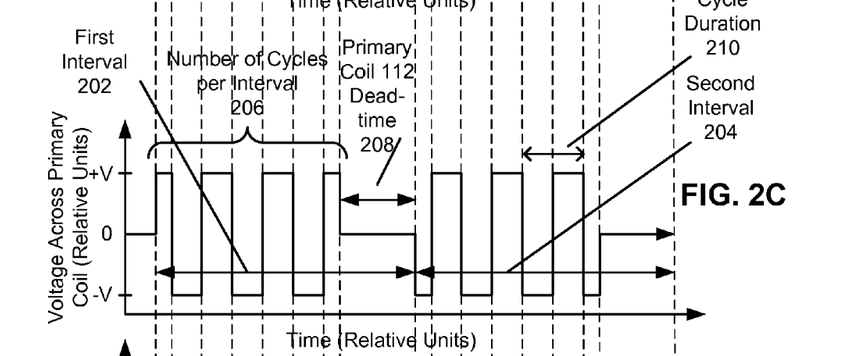
FIG. 2C depicts an exemplary graph of the voltage across the primary coil of an adapter transformer in accordance with an embodiment.
Figure 2D:
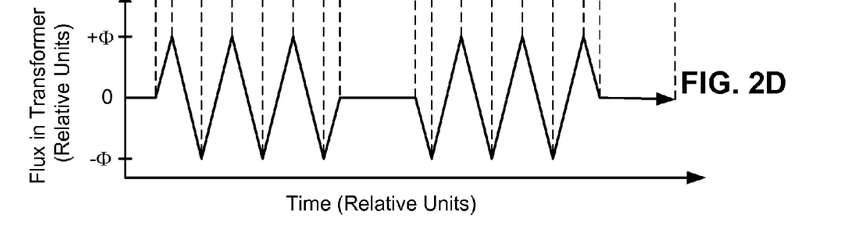
FIG. 2D depicts an exemplary graph of the flux in the transformer due to the voltage across the coil depicted in FIG. 2C in accordance with an embodiment.

FIGS. 2A and 2B depict exemplary graphs of control signals from controller 124 controlling, respectively, switches S1 and S4, and switches S2 and S3 in H-bridge 108 in accordance with an embodiment. FIG. 2C depicts an exemplary graph of the voltage across primary coil 112 as a result of the switching signals depicted in FIGS. 2A and 2B. FIG. 2D depicts an exemplary graph of the flux in transformer 110 due to the voltage across the coil depicted in FIG. 2C in accordance with an embodiment.

Note that for exemplary purposes only two intervals are depicted in each graph, first interval 202 and second interval 204. Embodiments may include more or fewer intervals. First interval 202 includes time periods T1 through T8 and second interval 204 includes time periods T9 through T16.

In time period T1, switches S1 and S4 are closed while switches S2 and S3 are open so that the voltage across primary coil 112 is positive as shown in FIG. 2C. During time period T1, the flux in transformer 110 builds up from zero to its maximum ($\Phi$). Then, in time period T2, controller 124 controls switches S1 and S4 to open and switches S2 and S3 to close so that the voltage across primary coil 112 is negative. During time period T2, the flux in transformer 110 goes from its maximum value in the positive direction to its maximum value in the negative direction ($-\Phi$). In period T3, controller 124 controls switches S1 and S4 to close and switches S2 and S3 to open so that the voltage across primary coil 112 is again positive. During period T3, the flux in transformer 110 goes from its maximum negative value ($-\Phi$) to its maximum positive value ($\Phi$). During subsequent time periods T4 and T5, the processes of time periods T2 and T3, respectively, are repeated, while time period T6 repeats the processes of time period T2. Then, in time period T7, switches S1 and S4 are closed and switches S2 and S3 are open so that the voltage across primary coil 112 is again positive. During period T7, the flux in transformer 110 goes from its maximum negative value ($-\Phi$) to zero. Then, in period T8, all switches S1 to S4 are open so there is no voltage across primary coil 112, and any remaining flux in transformer 110 will decay during time period T8.

During second interval 204, the open and closed positions of switches S1 to S4, and the direction of both the voltage across primary coil 112 and the flux in transformer 110 are inverted from those of the corresponding time periods in the first interval. Note that during each interval, as shown in FIG. 2C, the total duration of positive voltage across primary coil 112 is equal to the total duration of negative voltage across primary coil 112. Additionally, in the exemplary graph of the flux in transformer 110 depicted in FIG. 2D, the flux is zero at the start of each interval and zero during the last time period (e.g., T8 and T16). In other embodiments in which the total duration of positive voltage across primary coil 112 is not equal to the total duration of negative voltage across primary coil 112 (e.g., due to imperfections in controller 124, switches S1-S4 and/or for any other reason), time period T8 may be set to allow the flux in transformer 110 to decay enough so that flux does not build up in the core each interval, potentially saturating the core. Note that in some embodiments the voltage during the last time period in each interval (e.g., time periods T8 and T16) need not be reduced to exactly zero; it only needs to be reduced enough so that the flux in transformer 110 decays enough to prevent transformer 110 from saturating the core during any interval.

Note that the first voltage pulse across primary coil 112 at the start of an interval (e.g., T9) is in the opposite direction to the first voltage pulse (e.g., T1) of the previous interval. Additionally, note that the first voltage pulse across primary coil 112 at the start of an interval (e.g., T9) is in the opposite direction to the last voltage pulse (e.g., T7) of the previous interval. In some embodiments, this helps to reduce the build-up of flux in transformer 110. Furthermore, note that in the embodiment depicted in FIGS. 2A-2D, the first pulse (e.g., T1) and the last pulse (e.g., T7) in an interval are one-half the width of each of the other pulses (e.g., T2-T6) in the interval.

Note that the voltage across each arm of secondary coil 114 is determined by the voltage across primary coil 112 (e.g., as depicted in FIG. 2C) and the ratio of the turns in primary coil 112 and each arm of secondary coil 114. This voltage passes alternately through diode 116 and diode 118 and onto capacitor 120 and output 122.

Controller 124 may alter one or more parameters of the voltage across primary coil 112 during any portion of any interval, by varying one or more of the control parameters used to control H-bridge 108, including but not limited to number of cycles per interval 206, primary coil 112 dead-time 208 (e.g., T8 and T16), and cycle duration 210.

Figure 3A:
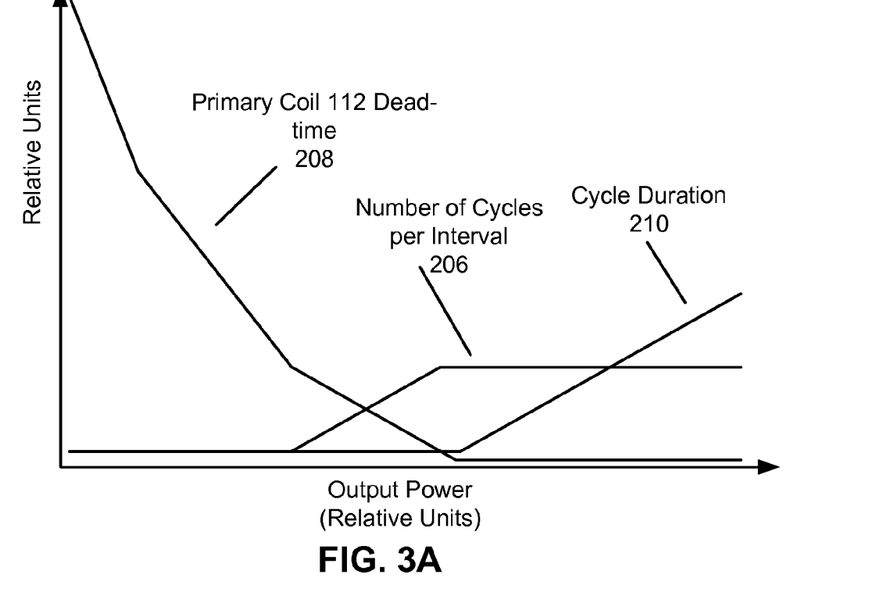
FIG. 3A depicts an exemplary graph of the variation of control parameters for a controller controlling the voltage across the primary coil of an adapter transformer vs. output power of the adapter in accordance with an embodiment.

FIG. 3A depicts an exemplary graph of the variation of these three parameters by controller 124 when controlling the voltage across the primary coil vs. output power of the adapter in accordance with an embodiment. Initially, as more power is demanded from the adapter, controller 124 will reduce the duration of primary coil 112 dead-time 208 to generate more power. Eventually, as the power demand increases, number of cycles per interval 206 will begin to increase and then eventually plateau. Then, as the power demand continues to increase, cycle duration 210 will increase. This is depicted in more detail in FIG. 3B.

Figure 3B:
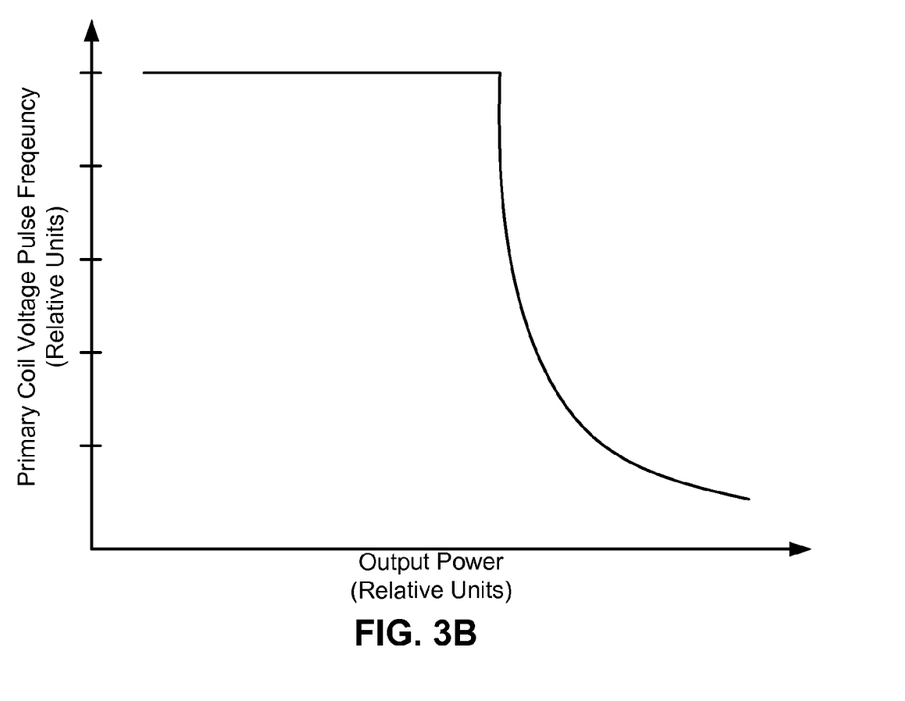
FIG. 3B depicts an exemplary graph of cycle frequency of the voltage across the primary coil of an adapter transformer vs. output power of the adapter in accordance with an embodiment.

FIG. 3B depicts an exemplary graph of cycle frequency of the voltage across the primary coil of an adapter transformer vs. output power of the adapter in accordance with an embodiment. In some embodiments, at low power, controller 124 controls the cycle frequency at about 500,000 Hz. Then, as the power demand increases, the controller starts to reduce the cycle frequency, eventually reducing it to about 50,000 Hz.

Figure 4A:
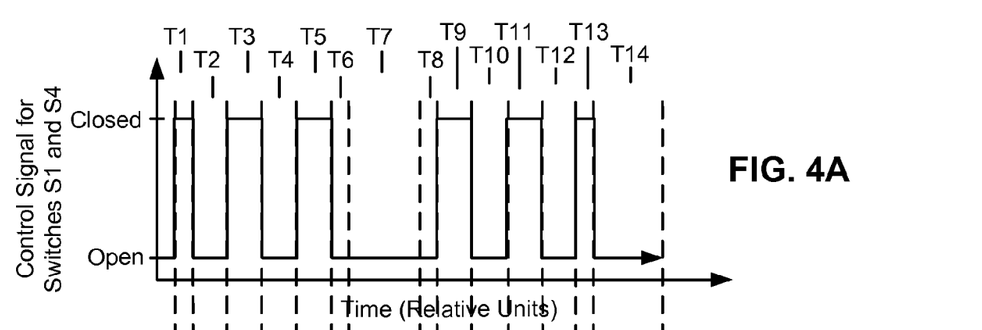
FIG. 4A depicts an exemplary graph of an alternate control signal controlling two switches in an H-bridge coupled to the primary coil of a transformer in accordance with an embodiment.
Figure 4B:
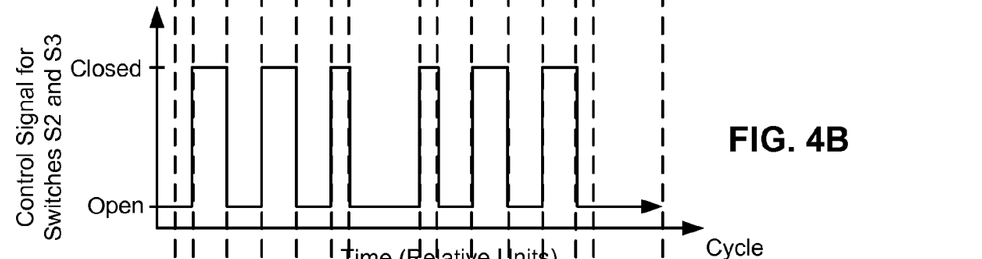
FIG. 4B depicts an exemplary graph of an alternate control signal controlling two other switches in an H-bridge coupled to the primary coil of a transformer in accordance with an embodiment.
Figure 4C:
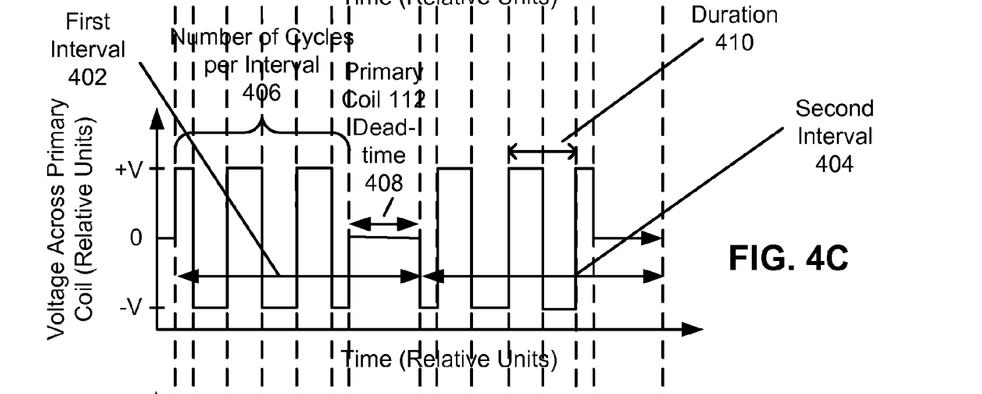
FIG. 4C depicts an exemplary graph of the voltage across the primary coil of an adapter transformer due to the alternate control signal in accordance with an embodiment.
Figure 4D:
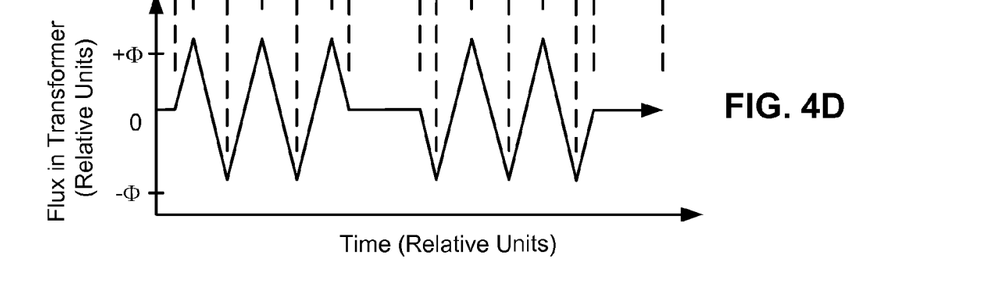
FIG. 4D depicts an exemplary graph of the flux in the transformer due to the voltage across the coil depicted in FIG. 4C in accordance with an embodiment.

FIGS. 4A and 4B depict exemplary graphs of alternate control signals from controller 124 controlling, respectively, switches S1 and S4, and switches S2 and S3 in H-bridge 108 in accordance with an embodiment. FIG. 4C depicts an exemplary graph of the voltage across primary coil 112 as a result of the switching signals depicted in FIGS. 4A and 4B. FIG. 4D depicts an exemplary graph of the flux in transformer 110 due to the voltage across the coil depicted in FIG. 4C in accordance with an embodiment.

Note that for exemplary purposes only two intervals are depicted in each graph, first interval 402 and second interval 404. Embodiments may include more or fewer intervals. First interval 402 includes time periods T1 through T7 and second interval 404 includes time periods T8 through T14.

In time period T1, switches S1 and S4 are closed while switches S2 and S3 are open so that the voltage across primary coil 112 is positive as shown in FIG. 4C. During time period T1, the flux in transformer 110 builds up from zero to its maximum ($\Phi$). Then, in time period T2, controller 124 controls switches S1 and S4 to open and switches S2 and S3 to close so that the voltage across primary coil 112 is negative. During time period T2, the flux in transformer 110 goes from its maximum value in the positive direction to its maximum value in the negative direction ($-\Phi$). In period T3, controller 124 controls switches S1 and S4 to close and switches S2 and S3 to open so that the voltage across primary coil 112 is again positive. During period T3, the flux in transformer 110 goes from its maximum negative value ($-\Phi$) to its maximum positive value ($\Phi$). During subsequent time periods T4 and T5, the processes of time periods T2 and T3, respectively, are repeated. Then, in time period T6, switches S1 and S4 are open and switches S2 and S3 are closed so that the voltage across primary coil 112 is negative, and the flux in transformer 110 goes from its maximum positive value ($\Phi$) to zero. Then, in period T7, all switches S1 to S4 are open so there is no voltage across primary coil 112, and any remaining flux in transformer 110 will decay during time period T7.

During second interval 404, the open and closed positions of switches S1 to S4, and the direction of both the voltage across primary coil 112 and the flux in transformer 110 are inverted from those of the corresponding time periods in the first interval. Note that during each interval, as shown in FIG. 4C, the total duration of positive voltage across primary coil 112 is equal to the total duration of negative voltage across primary coil 112. Additionally, in the exemplary graph of the flux in transformer 110 depicted in FIG. 4D, the flux is zero at the start of each interval and zero during the last time period (e.g., T7 and T14). In other embodiments in which the total duration of positive voltage across primary coil 112 is not equal to the total duration of negative voltage across primary coil 112 (e.g., due to imperfections in controller 124, switches S1-S4 and/or for any other reason), time period T7 may be set to allow the flux in transformer 110 to decay enough so that flux does not build up in the core each interval, potentially saturating the core. Note that in some embodiments the voltage during the last time period in each interval (e.g., time periods T8 and T16) need not be reduced to exactly zero; it only needs to be reduced enough so that the flux in transformer 110 decays enough to prevent transformer 110 from saturating the core during any interval.

The first voltage pulse across primary coil 112 at the start of an interval (e.g., T8) is in the opposite direction to the first voltage pulse (e.g., T1) of the previous interval. In some embodiments, this helps to reduce the build-up of flux in transformer 110. Additionally, note that in the embodiment depicted in FIGS. 4A-4D, the first pulse (e.g., T1) and the last pulse (e.g., T6) in an interval are one-half the width of each of the other pulses (e.g., T2-T5) in the interval.

Note that controller 124 may alter one or more parameters of the voltage across primary coil 112 during any portion of any interval, by varying one or more of the control parameters used to control H-bridge 108, including but not limited to number of cycles per interval 406, primary coil 112 dead-time 408 (e.g., T7 and T14), and cycle duration 410. Additionally, these parameters may be controlled by controller 124 as discussed above with respect to FIGS. 3A and 3B.

Figure 5:
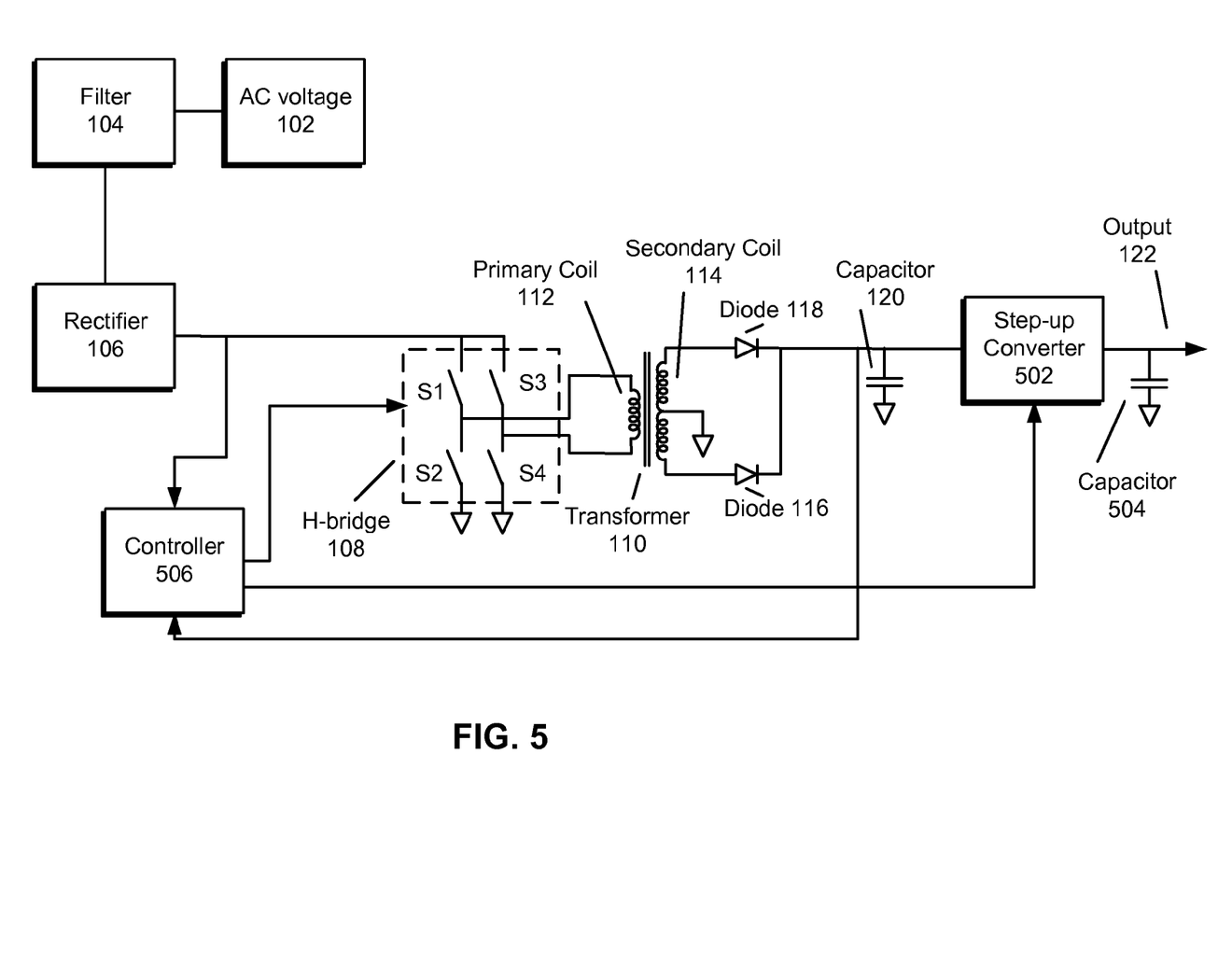
FIG. 5 shows an adapter including a step-up converter in accordance with an embodiment.

FIG. 5 shows an adapter including a step-up converter in accordance with an embodiment. In the embodiment of FIG. 5, step-up converter 502 is controlled by controller 506 and coupled to capacitor 120 and then across capacitor 504 to output 122. Step-up converter 502 can be any type of step-up converter that steps an input voltage up to a higher output voltage. In some embodiments, step-up converter 502 is a boost converter. Capacitor 504 can be any suitable capacitor. Controller 506 is similar to controller 124 and also includes control logic, programming and/or circuitry to control step-up converter 502 as described below with reference to FIGS. 6A and 6B.

Figure 6A:
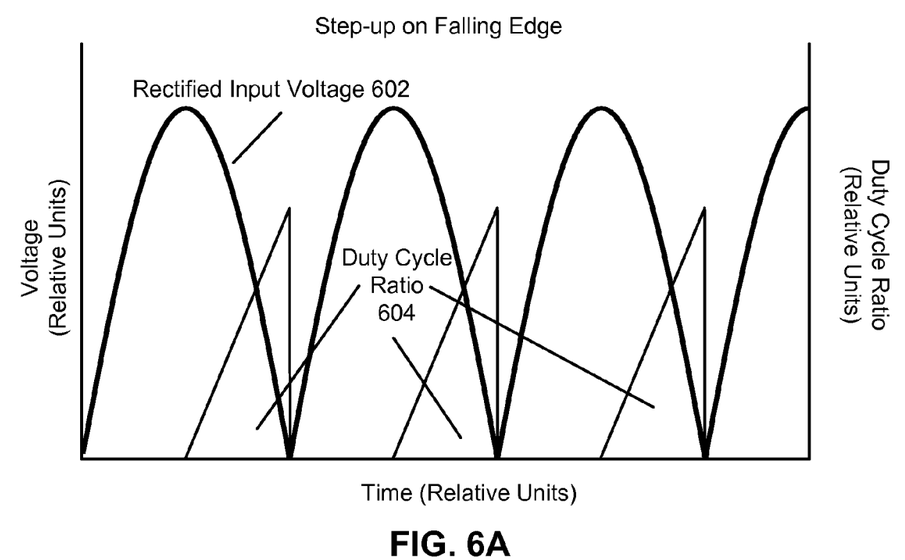
FIG. 6A depicts an exemplary graph of the rectified input voltage and the duty cycle ratio for a step-up converter in accordance with an embodiment.
Figure 6B:
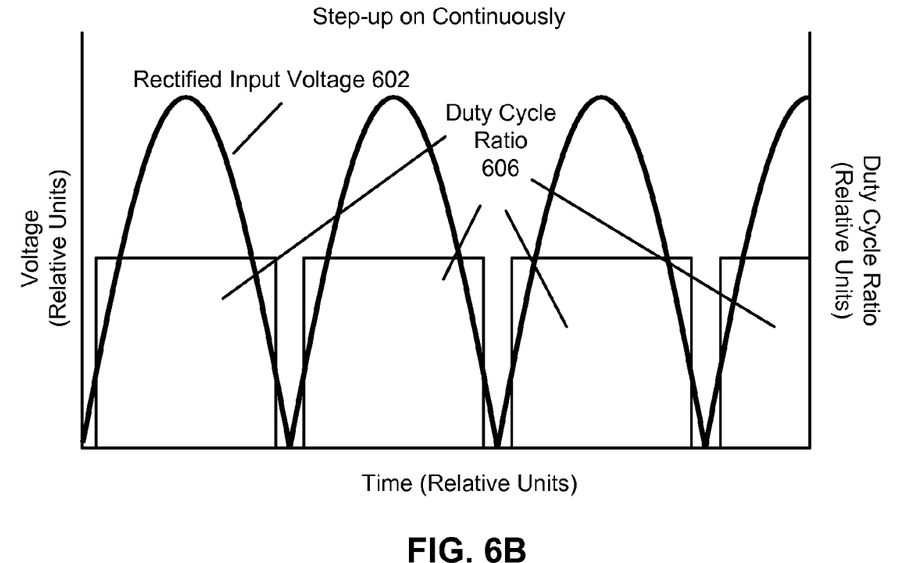
FIG. 6B depicts another exemplary graph of the rectified input voltage and the duty cycle ratio for a step-up converter in accordance with an embodiment.

FIGS. 6A and 6B depict exemplary graphs of the rectified input voltage and the duty cycle ratio for a step-up converter in accordance with embodiments. In the embodiment of FIG. 6A, rectified input voltage 602 represents the voltage output from rectifier 106 and into H-bridge 108. As depicted in FIG. 6A, controller 506 controls step-up converter 502 with a duty cycle ratio 604 that increases from 0% to a predetermined maximum duty cycle ratio (e.g., 70%) starting on the falling edge of each cycle of rectified input voltage 602. This can be used to improve the PFC of the adapter. Note that the predetermined maximum of duty cycle ratio 604 can be determined based on factors including but not limited to the desired output voltage and the power factor of the adapter.

In FIG. 6B, controller 506 controls step-up converter 502 so that it is on continuously. For example, in embodiments in which step-up converter 502 is a boost converter, controller 506 will control the boost converter to charge its inductor during the first portion of each full voltage pulse (e.g., T2-T6 and T10-T14) and to open the boost switch and boost the voltage during the second portion of each voltage pulse. This may be used to improve the PFC of the adapter. As depicted in FIG. 6B duty cycle ratio 606 is constant during most of rectified input voltage 602 (e.g. at 50%). Note that predetermined duty cycle ratio 606 can be determined based on factors including but not limited to the desired output voltage and the power factor of the adapter.

Figure 7:
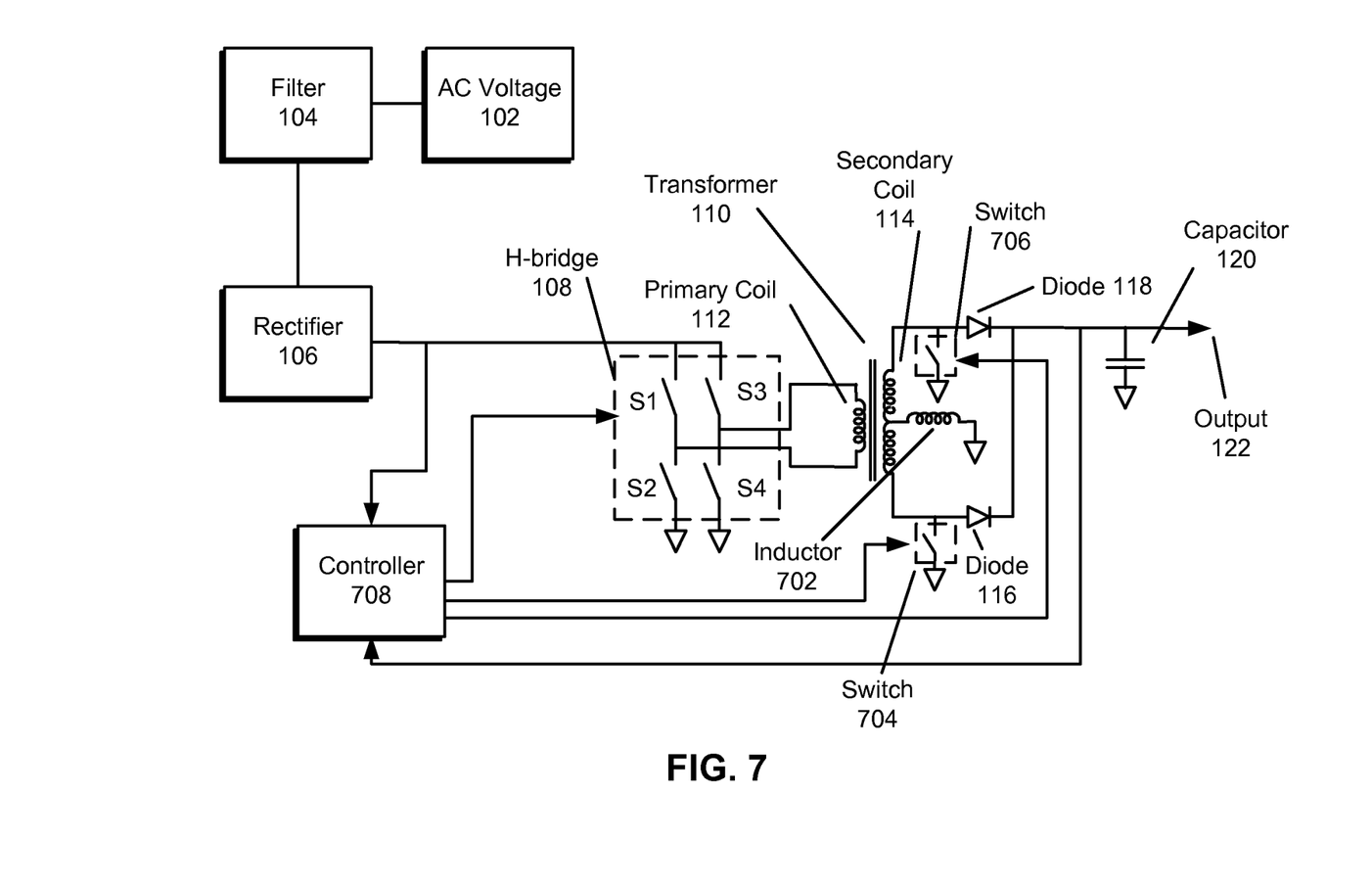
FIG. 7 shows another adapter in accordance with an embodiment.

FIG. 7 shows another adapter in accordance with an embodiment. In the embodiment of FIG. 7, inductor 702 is placed between the center tap of secondary coil 114 and ground. Switch 704 is coupled to the anode of diode 116 and is controlled by controller 708, and switch 706 is coupled to the anode of diode 118 and is controlled by controller 708.

Inductor 702 can be any type of inductor implemented in any technology. The inductance of inductor 702 can be selected based on parameters including the inductance of secondary coil 114. In some embodiments, the ratio between the inductance of each arm of secondary coil 114 and the inductance of inductor 702 is 5, 10 or in the range from 2 to 20. For example, in one embodiment, the inductance of one arm of secondary coil 114 is 100 microhenries and the inductance of inductor 702 is selected to be 10 microhenries.

Switch 704 and switch 706 can each be any type of switch implemented in any technology that can switch in response to a control signal. For example, switch 704 and/or switch 706 may include but are not limited to being relays, or transistors such as FETs, including MOSFET transistors, and may be implemented using any combination of discrete and integrated components, and analog and/or digital technology. Controller 708 is similar to controller 124 and also includes control logic, programming and/or circuitry to control switch 704 and switch 706 as described below.

When controller 708 controls switches 704 and 706 to close and open, these switches in combination with the energy stored in inductor 702 act to step-up the voltage from secondary coil 114. Controller 708 therefore can control switches 704 and 706 to implement the step-up on the falling edge of rectified input voltage 602 as depicted in FIG. 6A or to step-up continuously as depicted in FIG. 6B. In some embodiments, controller 708 does not operate switches 704 and 706 to help with PFC until the power demand from the adapter exceeds 60 W.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for controlling a voltage across a primary coil in an adapter transformer, comprising:
   during each of one or more intervals,
   applying a first voltage pulse across the primary coil in a start direction, wherein the start direction alternates between a first direction and a second direction each interval;
   applying a predetermined number of subsequent voltage pulses across the primary coil, wherein the subsequent voltage pulses alternate between the first direction and the second direction;
   applying a last voltage pulse voltage across the primary coil; and
   reducing the voltage across the primary coil for a predetermined time;
   wherein at least one of a frequency at which the direction of the predetermined number of subsequent voltage pulses across the primary coil is alternated, the predetermined number of times the direction of the voltage pulse across the primary coil is alternated, and the predetermined time that the voltage across the primary coil is reduced is changed based on a power demand from the adapter transformer.

2. The method of claim 1, wherein:
   a duration of the first voltage pulse is equal to a duration of the last voltage pulse; and
   the duration of the first voltage pulse is equal to one half of a duration of one of the predetermined number of subsequent voltage pulses.

3. The method of claim 1, wherein reducing the voltage across the primary coil for the predetermined time includes reducing the voltage to zero volts across the primary coil for the predetermined time.

4. The method of claim 1, wherein the predetermined number of subsequent voltage pulses across the primary coil alternate between the first direction and the second direction at a frequency between 50,000 Hz and 500,000 Hz.

5. The method of claim 1, further including:
   stepping up an output voltage of the adapter transformer to greater than or equal to a predetermined value, wherein stepping-up the output voltage of the adapter transformer includes stepping-up the output voltage of the adapter transformer based on a power factor correction of the adapter transformer.

6. The method of claim 1, wherein:
   during each interval, a duration of voltage pulses in the first direction is equal to a duration of voltage pulses in the second direction.

7. An adapter, comprising:
   a transformer with a primary coil;
   an H-bridge coupled to the primary coil; and
   a control circuit coupled to the H-bridge that controls a voltage across the primary coil using the H-bridge, wherein the control circuit is configured to control the H-bridge so that during each of one or more intervals,
   a first voltage pulse is applied across the primary coil in a start direction, wherein the start direction alternates between a first direction and a second direction each interval;
   a predetermined number of subsequent voltage pulses is applied across the primary coil, wherein the subsequent voltage pulses alternate between the first direction and the second direction;
   after the predetermined number of times, a last voltage pulse is applied across the primary coil; and
   the voltage across the primary coil is reduced for a predetermined time;
   wherein the control circuit is further configured so that at least one of a frequency at which the direction of the predetermined number of subsequent voltage pulses across the primary coil is alternated, the predetermined number of times the direction of the voltage pulse across the primary coil is alternated, and the predetermined time that the voltage across the primary coil is reduced is changed based on a power demand from the adapter.

8. The adapter of claim 7, wherein the control circuit is further configured so that:
   a duration of the first voltage pulse is equal to a duration of the last voltage pulse; and
   the duration of the first voltage pulse is equal to one half of a duration of one of the predetermined number of subsequent voltage pulses.

9. The adapter of claim 7, wherein the control circuit is configured so that the voltage across the primary coil is reduced to zero volts for the predetermined time.

10. The adapter of claim 7, wherein the control circuit is further configured so that of the predetermined number of subsequent voltage pulses across the primary coil alternate between the first direction and the second direction at a frequency between 50,000 Hz and 500,000 Hz.

11. The adapter of claim 7, further including:
a boost converter coupled to an output of the transformer; and
a boost converter controller coupled to the boost converter, wherein the boost converter controller controls the boost converter and is configured to operate the boost converter based on a power factor correction of the adapter.

12. The adapter of claim 7, wherein:
during each interval, a duration of voltage pulses in the first direction is equal to a duration of voltage pulses in the second direction.

13. An adapter, comprising:
a rectifier with an input and an output;
an H-bridge with an input and an output, wherein the output of the rectifier is coupled to the input of the H-bridge;
a transformer with a primary coil and a secondary coil, wherein the primary coil is coupled to the output of the H-bridge and the secondary coil includes a center tap coupled to a ground, and a first end tap and a second end tap;
a first diode with a first anode and a first cathode, wherein the first anode is coupled to the first end tap;
a second diode with a second anode and a second cathode, wherein the second anode is coupled to the second end tap, and the first cathode is coupled to the second cathode; and
a control circuit coupled to the H-bridge that controls a voltage across the primary coil using the H-bridge, wherein the control circuit is configured to control the H-bridge so that during each of one or more intervals,
a first voltage pulse is applied across the primary coil in a start direction, wherein the start direction alternates between a first direction and a second direction each interval;

a predetermined number of subsequent voltage pulses is applied across the primary coil, wherein the subsequent voltage pulses alternate between the first direction and the second direction;
after the predetermined number of times, a last voltage pulse is applied across the primary coil; and
the voltage across the primary coil is reduced for a predetermined time;
wherein the control circuit is further configured so that at least one of a frequency at which the direction of the predetermined number of subsequent voltage pulses across the primary coil is alternated, the predetermined number of times the direction of the voltage pulse across the primary coil is alternated, and the predetermined time that the voltage across the primary coil is reduced is changed based on a power demand from the adapter.

14. The adapter of claim 13, further including:
a boost converter coupled to the first cathode and the second cathode; and
a boost converter controller couple to the boost converter, wherein the boost converter controller controls the boost converter and is configured to operate the boost converter based on a power factor correction of the adapter.

15. The adapter of claim 13, wherein:
during each interval, a duration of voltage pulses in the first direction is equal to a duration of voltage pulses in the second direction.

16. The adapter of claim 13, further including:
an inductor coupled between the center tap and the ground;
a first switch coupled between the first anode and the ground; and
a second switch coupled between the second anode and the ground.

17. The adapter of claim 13, wherein the control circuit is further configured so the predetermined number of subsequent voltage pulses across the primary coil alternate between the first direction and the second direction at a frequency between 50,000 Hz and 500,000 Hz.

* * * * *